United States Patent Office 3,120,542
Patented Feb. 4, 1964

3,120,542
IMIDAZOLEPHOSPHITES
George W. Anderson, Riehen, Switzerland, and Richard W. Young, Cos Cob, Conn., assignors to American Cyanamid Company, New York, N.Y., a corporation of Maine
No Drawing. Filed Nov. 23, 1960, Ser. No. 71,150
3 Claims. (Cl. 260—309)

This invention relates to an improved process for the synthesis of peptides and to certain new reagents for use therein.

The synthesis of peptides is normally effected by the reaction of amino acids or an amino acid and a peptide. In order to make the reaction occur at the desired point, it is necessary to block the amino groups in one of the constituents and the carboxyl group in the other. Blocking of the amino group is conventionally effected by suitable acyl groups, such as, for example, carbobenzoxy, phthaloyl, tertiary butyl carbonyl and the like. The carboxylic acid group of the other constituents is blocked usually by forming an alkyl ester thereof and in some cases by forming a salt. Since this leaves one carboxyl free and one amino free, this is the point at which the peptide synthesis takes place. In the case of polypeptides, one of the reagents is itself a peptide and it too must have either its amino or carboxylic acid group blocked. The reaction to form a long chain polypeptide requires a number of steps and as a result, yields in the steps become of great importance as poor yields can enormously reduce the overall yield of the final polypeptide. In the case of dipeptides, the problem of yield is also important because the reagents are fairly expensive, though changes in yield in such a single step synthesis are not as dramatic in their consequence on overall yield as in the case of longer chain polypeptides.

Considerable reesarch has been undertaken to improve the yields in peptide synthesis and marked improvements have been obtained when a tetraalkyl pyrophosphite is used in the reaction. The tetraalkyl pyrophosphite is not a catalyst and is used in substantially stoichiometrical proportions. This improved process is described and claimed in the patent to George W. Anderson, No. 2,691,010, October 5, 1954. Three ways of using the tetraalkyl pyrophosphite are possible. Thus, the pyrophosphite may be added to the reaction mixture in the peptide synthesis. This is described by G. W. Anderson et al. in an article on page 5309 of the November 5, 1952, issue of the Journal of the American Chemical Society, volume 74, as the "standard" procedure. The second method is to react the tetraalkyl pyrophosphite with a carboxylic acid group of the amino acid to form an anhydride of the acid and dialkyl phosphorous acid. This is referred to in the article as the "anhydride" procedure. Finally, the tetraalkyl pyrophosphite may be reacted with the amine of the amino acid ester, which is referred to in the article as the "amide" process. Throughout the remainder of this specification, these shorter designations will be used without quotation marks.

It is with the tetraalkyl pyrophosphite processes referred to above that the present invention deals. It is particularly applicable to two of the three, namely, the standard and the anhydride process. The process involves the use of a substantial amount of an imidazole and its N-lower alkyl homologs. It is also possible to use special reagents having the formula:

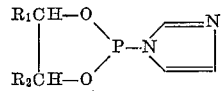

in which $R_1$ and $R_2$ are hydrogen or lower alkyl radicals and

when taken together forms an orthophenylene radical. These compounds are, for example, ethylene phosphor-N-imidazolite, isopropylene phosphor-N-imidazolite, orthophenylene phosphor-N-imidazolite etc. In these modifications, the new reagent takes the place of both the imidazole and the tetraalkyl pyrophosphite.

This invention is a continuation-in-part of our copending application Serial No. 761,289, filed September 16, 1958, now abandoned.

The present invention results in markedly increased yields in the peptide synthesis, but only when reagents of imidazole are used of at least 25% molar and preferably not more than 150% molar. Optimum results are obtained at about equimolar proportion, based on the amino acid derivatives used.

The other conditions of the peptide synthesis are not changed from those described in the Anderson patent and article. Thus, for example, when a hydrohalide of the amino acid ester is used, it is desirable to have a halogen acid acceptor, such as a trialkyl phosphite and the like. It is also desirable for easy reaction mixture handling to add dialkyl phosphite as the solvent. The amount is not critical but should be sufficient to give a readily stirrable reaction mixture. Temperatures, times and other reaction conditions are not changed by the present invention which constitutes an additional advantage of the invention as it does not require learning new techniques or changing plant equipment or operating procedures. The purity of the imidazole is not critical. It is removed in the process and ordinary commercial grades may be used.

The particular amino acids to which the present invention is directed are the naturally occurring α-amino acids described for example by P. Karrer, Organic Chemistry, Second English Edition, Elsevier Publishing Company, Inc., New York, 1946. Among the naturally occurring amino acids may be mentioned for example, alanine, serine, aminobutyric acid, cystine, methionine, valine, norleucine, leucine, isoleucine, phenylalanine, tyrosine, dihydroxyphenylalanine, tryptophane, arginine, lysine, ornithine, aspartic acid, asparagine, glutamic acid, glutamine, glycine, hystidene, proline, hydroxyproline, tyrosine and threonine. Since these are α-aminocarboxylic acids, they can be illustrated by the following formula:

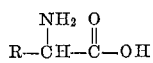

wherein R is the residue remaining of the amino acids described above.

The invention will be described in greater detail in conjunction with the following specific examples in which the parts are by weight unless otherwise specified.

EXAMPLE 1

2.09 parts of carbobenzoxyglycine, 2.31 parts of tertiary butyl-DL-phenylalaninate and 2.84 parts of tetraethyl pyrophosphite are mixed with about 7 parts of diethyl phosphite as a solvent. The reaction mixture is allowed to stand at room temperature for 2 hours, whereupon 40 parts of water are added to precipitate the dipeptide product as an oil. This was separated and crystallized by seeding and chilling and finally washed with 10 parts of water and then with 10 parts of a 5% aqueous sodium bicarbonate solution followed by a final 10 parts of water. The residue was then dried and weighed and a yield of 31.5% was obtained. This is the standard procedure.

The above procedure was repeated except that 0.68 parts of imidazole was added to the reaction mixture. The yield increased to 50.5%, representing a substantially 60% increase in yield.

Following the above procedure and reacting carbobenzoxy-L-isoleucine with methyl glycinate dihydrochloride in the presence of tetraethyl pyrophosphite and imidazole in approximately equal molecular quantities, a high yield of methyl carbobenzoxy-L-isoleucyl-L-glycinate is obtained.

EXAMPLE 2

Equimolecular quantities of tertiarybutyloxy-carbonyl-L-leucine hydrate and ethyl glycinate hydrobromide were reacted in diethyl phosphite solvent with 2.2 moles of tetraethyl pyrophosphite. Sufficient trimethyl phosphite was present in order to remove the hydrogen bromide set free. The use of trialkyl phosphites as halogen acid acceptors is described and claimed in our prior patent, No. 2,722,526, November 1, 1955. The reason for the excess of tetraethyl pyrophosphite is that one equivalent is needed to remove the water present as water of hydration in the leucine hydrate. The reaction mixture was heated on a steam bath until complete and the product precipitated by water and purified as described in Example 1. The yield was 71.5%.

The procedure was repeated except that one equivalent of imidazole was added to the reaction mixture. The yield was 82%, a 15% increase.

EXAMPLE 3

Equimolar quantities of tertiarybutyloxy-carbonyl-L-proline and methyl-L-phenylalaninate hydrobromide were reacted with tetraethyl pyrophosphite and trimethyl phosphite as described in the foregoing example. After the reaction was complete, water was added and the peptide recovered and purified as described in Example 2. The yield was 65%.

The procedure was repeated adding a mole of imidazole to the reaction mixture and the yield increased to 75%.

EXAMPLE 4

Ethyl carbobenzoxyglycyl-L-phenylalanylglycinate was prepared by a sequential procedure involving three steps as follows:

(a) 1.65 parts of L-phenylalanine, 3.59 parts of p-nitrophenyl tertiarybutyl carbonate and 2.65 parts of sodium carbonate were refluxed together in 20 parts of 50% aqueous tertiary butanol. After the reaction was complete, the excess tertiary butanol was evaporated, the mixture filtered, acidified with hydrochloric acid to a pH of 6, extracted with ether and the ether layer discarded. The aqueous solution was then acidified to a pH of 1 and the product, tertiarybutyloxycarbonyl-L-phenylalanine recovered. One mole of the product and a mole of ethyl glycinate hydrobromide were reacted by heating on a steam bath with one mole of tetraethyl pyrophosphite, two and a half moles of trimethyl phosphite and about two and a third moles of diethyl phosphite. After the reaction was complete by heating on a steam bath, ethyl tertiarybutyloxycarbonyl-L-phenylalanylglycinate was obtained.

(b) The ethyl tertiarybutyloxycarbonyl-L-phenylalanylglycinate was reacted with hydrogen bromide to form ethyl L-phenylalanylglycinate hydrobromide.

(c) Equimolecular quantities of carbobenzoxyglycine, ethyl L-phenylalanylglycinate hydrobromide and tetraethyl pyrophosphite and a small excess of trimethyl phosphite were reacted in a diethyl phosphite medium by heating gently on a steam bath until the reaction was complete. The product, ethyl carbobenzoxyglycyl-L-phenylalanylglycinate, was then recovered and purified as described in the preceding examples. An overall yield between 50% and 55% was obtained.

The above procedure was repeated with the addition of one mole of imidazole in the peptide-forming step of (a). All other conditions remained the same. The yield of tripeptide in pure form increased to 68%, an increase of somewhat more than 25%.

EXAMPLE 5

A series of reactions were carried out between equimolecular quantities of carbobenzoxyglycine and ethyl-L-tyrosinate in the presence of 1.1 moles of tetraethyl pyrophosphite and sufficient diethyl phosphite to obtain a readily stirrable mixture. The process was carried out by heating on a steam bath and various amounts of imidazole were added together with a control test with no imidazole. In each case, the purification and recovery was by the same procedure as described in the foregoing examples and constitutes an illustration of the standard procedure as described in the Anderson article. The product yields are as follows:

|   | Percent |
|---|---|
| (a) With no imidazole present | 65 |
| (b) With 0.0025 mole of imidazole present | 68 |
| (c) With 0.0075 mole of imidazole present | 85 |
| (d) With 0.0100 mole of imidazole present | 87 |
| (e) With 0.0125 mole of imidazole present | 82 |

It will be noted that optimum yields are obtained at approximately equimolecular quantities of imidazole and reactants, although the yields remain high with as little as 75% equimolaring and as much as 125%.

The anhydride procedure was carried out by reacting a mole of carbobenzoxyglycine with a mole of tetraethyl pyrophosphite in diethyl phosphite solution by warming. This produced the amino acid-phosphorous acid anhydride. A mole of ethyl-L-tyrosinate and a mole of imidazole were then added and heating on a steam bath carried out until the reaction was substantially complete. The product was purified and recovered as described in the preceding examples and an 86% yield was obtained.

The above procedure was repeated with 0.01 mole of imidazole and diethylene pyrophosphite in place of the tetraethyl pyrophosphite. The same high yield was obtained.

The above procedure was repeated using diethylethylene pyrophosphite in place of the tetraethyl pyrophosphite. Again the high yields were obtained.

A modification of the standard procedure was carried out by reacting a mole of imidazole with a mole of tetraethyl pyrophosphite by heating on a steam bath. This solution was then added to equimolecular quantities of carbobenzoxyglycine and ethyl-L-tyrosinate in diethyl phosphite solution and the heating resumed until the reaction was complete. After recovering and purifying as described in the foregoing examples, a yield of 92% was obtained.

It will be noted that both in the standard and anhydride procedures and in the somewhat modified standard procedures, marked increases in yield were obtained. The example also illustrates the use of other pyrophosphites with similar high yields.

Following the above procedure and using carbobenzoxy-L-asparagine which is reacted with methyl L-nitroargininate in the presence of tetraloweralkyl pyrophosphite and unsubstituted imidazole in approximately equal molecular quantities, a high yield of methyl carbobenzoxy-L-asparaginyl-L-nitroargininate is obtained.

EXAMPLE 6

The standard procedure of the foregoing example was carried out with no imidazole and with imidazole, imidazole hydrobromide and N-methylimidazole, respectively. The yields were as follows:

| | Percent yield |
|---|---|
| Control | 65 |
| Imidazole | 87 |
| Imidazole hydrobromide | 87 |
| N-methylimidazole | 90 |

It will be noted that the imidazole was just as effective in the form of its hydrohalide salt and that its homologs are at least as effective. Other homologs, such as N-ethylimidazole, may be used, the yields being substantially the same.

EXAMPLE 7

Ethyl-S-benzyl-L-cysteinate hydrochloride (6.08 parts) was suspended in 100 parts of absolute ether and treated with 5.00 parts of triethylamine. The hydrochloride of triethylamine (3.61 parts—theoretical 3.03 parts) was filtered off. The filtrate was concentrated, the 5.18 parts of residual ethyl S-benzyl-L-cysteinate treated with 8.28 parts of tosyl-L-glutaminyl-L-asparagine, 14 parts of diethyl phosphonate, 1.36 parts of imidazole and 5.68 parts of tetraethylpyrophosphite. The mixture was warmed with occasional stirring on a steam bath for 30 minutes, whereupon it solidified. One hundred parts of water were added and the mixture stirred vigorously. After cooling to 0° C. for 30 minutes the product was collected. It was washed with 25 parts of 1 N hydrochloric acid, 100 parts of water, 25 parts of saturated sodium bicarbonate solution and 100 parts of water. The product was dried in a steam cabinet to give 7.4 parts (58% yield) of ethyl tosyl-L-glutaminyl-L-asparaginyl-S-benzyl-L-cysteinate, melting point 187–192° C.

When this reaction was run without the addition of imidazole a 29% yield of ethyl tosyl-L-glutaminyl-L-asparaginyl-S-benzyl-L-cysteine was obtained.

EXAMPLE 8

*Preparation of Ethylene Phosphor-N-Imidazolidite [2-(1-Imidazolyl)-1,3,2-Dioxaphospholane]*

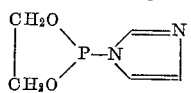

Imidazole (0.050 mole) and triethylamine (0.050 mole) were added to 75 ml. of dry benzene. With cooling in an ice bath, ethylene chlorophosphite (0.050 mole) was added. After 5 minutes, precipitated triethylammonium chloride was filtered of. Removal of the solvent by vacuum distillation left a solid residue. This residue was purified by taking it up in anhydrous ether and chilling in Dry-Ice-acetone bath to bring about crystallization. The colorless, hydroscopic solid gave a correct carbon and hydrogen analysis.

In the above example when isopropylene chlorophosphite is substituted for ethylene chlorophosphite the product obtained is isopropylene phosphor-N-imidazolidite.

EXAMPLE 9

The standard procedure of Example 5 was repeated substituting a mole of the ethylene phosphor-N-imidazolidite for the tetraethyl pyrophosphite. The material was recovered and purified as described in Example 5 and a 91% yield of ethyl carbobenzoxyglycyl-L-tyrosinate was obtained.

EXAMPLE 10

*Preparation of o-Phenylene Phosphor-N-Imidazolidite*

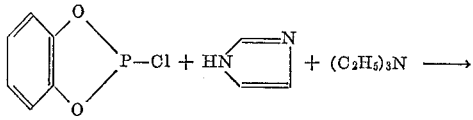

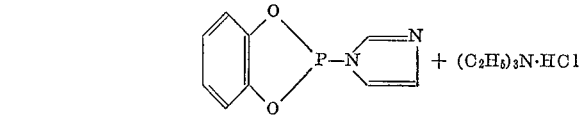

Example 8 was repeated substituting orthophenylene chlorophosphite for the ethylene chlorophosphite producing a colorless solid o-phenylene phosphor-N-imidazolidite.

EXAMPLE 11

The procedure of Example 9 was repeated replacing the ethylene phosphor-N-imidazolidite with the product of Example 10. A 75% yield of ethyl carbobenzoxyglycyl-L-tyrosinate was obtained.

We claim:
1. Compounds having the formula:

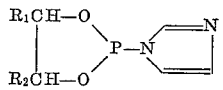

wherein $R_1$ and $R_2$ are selected from the group consisting of hydrogen and lower alkyl and

when taken together forms orthophenylene.

2. The compound having the formula:

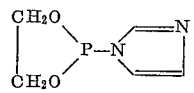

3. The compound having the formula:

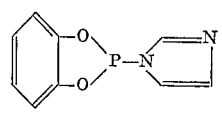

References Cited in the file of this patent

UNITED STATES PATENTS

| 2,691,010 | Anderson | Oct. 5, 1954 |
| 2,905,692 | Paleveda et al. | Sept. 22, 1959 |
| 2,915,875 | Van Winkle et al. | Dec. 8, 1959 |
| 2,917,517 | Rosenberg | Dec. 15, 1959 |
| 2,953,558 | Darlington et al. | Sept. 20, 1960 |

OTHER REFERENCES

Anderson et al.: Jour. Amer. Chem. Soc., vol. 74, pp. 5304–6 (1952).

Arbuzov et al.: Chem. Abstracts, vol. 47, pp. 10461g (1953).

Anderson et al.: Jour. Org. Chem., vol. 23, pp. 1236–7 (1958).